A. F. MacGLASHAN.
BAGGAGE CARRIER FOR AUTOMOBILES.
APPLICATION FILED MAR. 27, 1916.
1,232,350.
Patented July 3, 1917.
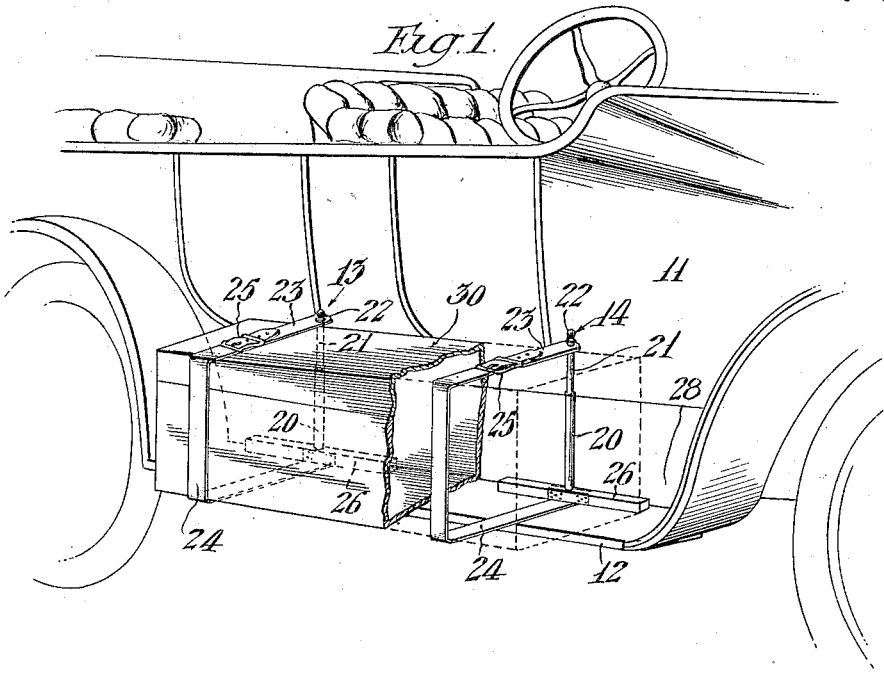
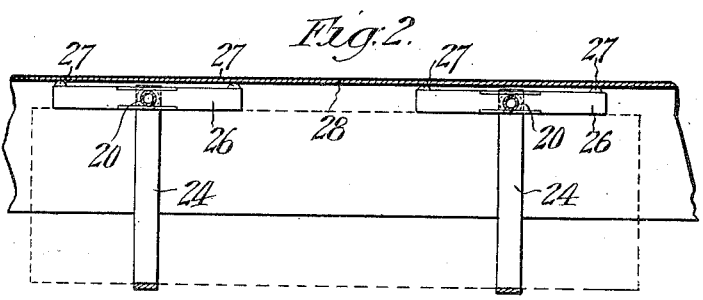
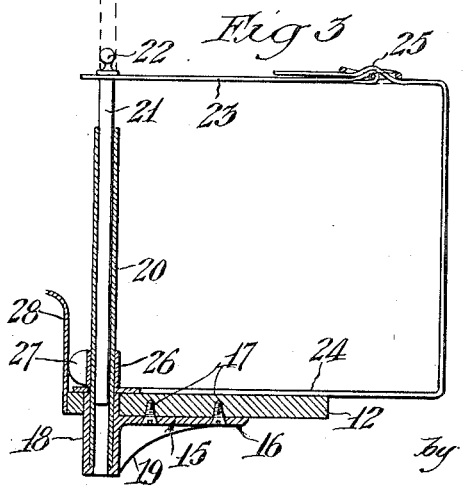
Inventor
Andrew F. Mac Glashan
by Townsend, Graham + Harris
his Attorneys

UNITED STATES PATENT OFFICE.

ANDREW F. MacGLASHAN, OF LOS ANGELES, CALIFORNIA.

BAGGAGE-CARRIER FOR AUTOMOBILES.

1,232,350.

Specification of Letters Patent.

Patented July 3, 1917.

Application filed March 27, 1916. Serial No. 87,108.

*To all whom it may concern:*

Be it known that I, ANDREW F. MAC-GLASHAN, a citizen of the United States, residing at Los Angeles, in the county of Los Angeles and State of California, have invented a new and useful Baggage-Carrier for Automobiles, of which the following is a specification.

My invention relates to automobiles, and the object of the invention is to provide a baggage carrier which can be quickly secured to the running board of an automobile and the main portion of which may be removed when not in use.

In the drawings, which are for illustrative purposes only:

Figure 1 is a perspective view of my invention applied to an automobile, a portion of the box carried by the baggage carrier being shown broken away to better illustrate the invention.

Fig. 2 is a plan view, the baggage being shown in dotted lines.

Fig. 3 is a sectional elevation on an enlarged scale of the method of fastening the baggage carrier to the automobile.

In the form of the invention illustrated in the drawings, 11 is an automobile having a running board 12. Secured on the running board are two baggage carriers 13 and 14 which are exact duplicates of each other, each of these baggage carriers consisting of a bracket 15 having a foot 16 which extends under the running board 12 and is permanently secured thereto by means of screws 17. A hub 18 is secured to the foot 16, ribs 19 being provided for suitably connecting the foot 16 and the hub 18 together. Removably seated in the hub 18 is a pipe 20 in which a rod 21 is free to slide, this rod 21 having an enlarged head 22 under which is secured an upper strap 23. A lower strap 24 is secured about the tube 20 adjacent to the running board 12, the straps 23 and 24 being secured together by means of a buckle 25. A spacing bar 26 is placed over the tube 20, being provided with rubber buttons 27 so placed as to contact with the sides 28 of the automobile to hold the various parts in line.

The method of operation of the invention is as follows:

The pipe 20, the rod 21, the straps 23 and 24, and the spacing bar 26 are ordinarily carried in the tool box under the rear seat, or any other convenient receptacle of the automobile. The brackets 15 being inconspicuously located are not noticeable when not in use. When it is desired to use the baggage carrier, the pipe 20 is slipped into the hub 18 and the strap 24 is secured thereover, the spacing bar 26 is then dropped over the pipe 20, the rod 21 then being placed in the pipe 20 with the strap 23 secured thereover, and the baggage is placed as shown in Fig. 1, the straps 23 and 24 encircling the baggage and being secured by the buckles 25. The spacing bar 26 serves to hold the baggage out from the body of the automobile and prevent it from moving around, at the same time tending to hold the various parts in alinement.

I claim as my invention:—

1. A baggage carrier for automobiles comprising a plurality of brackets permanently secured to the running board of an automobile, a pipe detachably secured in each of said brackets, a rod sliding freely in said pipe, and straps secured to said pipe and said rod for encircling and securing the baggage.

2. A baggage carrier for automobiles comprising a plurality of brackets permanently secured to the running board of an automobile, a pipe detachably secured in each of said brackets, a rod sliding freely in said pipe, a spacing bar placed over each of said pipes adjacent to said running board, and straps secured to said pipe and said rod for encircling and securing the baggage.

3. A baggage carrier for automobiles comprising a plurality of brackets permanently secured to the running board of an automobile, a pipe detachably secured in each of said brackets, a rod sliding freely in said pipe, straps secured to said pipe and said rod for encircling and securing the baggage, and means by which said straps may be secured together at different portions of their length to suit the girths of different sizes of baggage.

4. A baggage carrier for automobiles comprising a plurality of brackets permanently secured to the running board of an automobile, a pipe detachably secured in each of said brackets, a rod sliding freely in said pipe, a spacing bar placed over each of said pipes adjacent to said running board, straps secured to said pipe and said rod for encircling and securing the baggage, and means by which said straps may be secured together at different portions of their length to suit the girths of different sizes of baggage.

In testimony whereof, I have hereunto set my hand at Los Angeles, California, this 17th day of March, 1916.

ANDREW F. MacGLASHAN.